(12) United States Patent
Matsui et al.

(10) Patent No.: US 8,405,492 B2
(45) Date of Patent: Mar. 26, 2013

(54) IN-VEHICLE WIRELESS COMMUNICATION TERMINAL

(75) Inventors: Ryohei Matsui, Kariya (JP); Tsutomu Hayashi, Kariya (JP); Hiroyasu Ogino, Kariya (JP)

(73) Assignee: Denso Corporation, Kariya (JP)

( * ) Notice: Subject to any disclaimer, the term of this patent is extended or adjusted under 35 U.S.C. 154(b) by 252 days.

(21) Appl. No.: 13/065,494

(22) Filed: Mar. 23, 2011

(65) Prior Publication Data

US 2011/0241854 A1 Oct. 6, 2011

(30) Foreign Application Priority Data

Apr. 6, 2010 (JP) .................................. 2010-87739

(51) Int. Cl.
*B60R 25/10* (2006.01)

(52) U.S. Cl. .................................... 340/426.1

(58) Field of Classification Search ............... 340/426.1, 340/436, 426.16, 13.24, 426.18; 455/222
See application file for complete search history.

(56) References Cited

U.S. PATENT DOCUMENTS

| | | | | |
|---|---|---|---|---|
| 5,457,814 | A | * | 10/1995 | Myrskog et al. .............. 455/571 |
| 2007/0254717 | A1 | * | 11/2007 | Yahagi ........................ 455/562.1 |
| 2009/0005102 | A1 | * | 1/2009 | Das et al. ...................... 455/522 |
| 2009/0312047 | A1 | * | 12/2009 | Satou et al. ................... 455/522 |

FOREIGN PATENT DOCUMENTS

| | | |
|---|---|---|
| JP | 07-079195 | 3/1995 |
| JP | 08-256103 | 10/1996 |
| JP | 2003-087147 | 3/2003 |
| JP | 2003-298507 | 10/2003 |
| JP | 2004-90674 | 3/2004 |
| JP | 3797842 | 4/2006 |
| JP | 2006-148709 | 6/2006 |
| JP | 3846351 | 9/2006 |
| JP | 2008-248653 | 10/2008 |

* cited by examiner

*Primary Examiner* — Phung Nguyen
(74) *Attorney, Agent, or Firm* — Harness, Dickey & Pierce, PLC

(57) ABSTRACT

An in-vehicle wireless terminal is disclosed. The in-vehicle wireless terminal includes a disconnection detection section for detecting whether an antenna is disconnected, and a determination section for determining whether the vehicle is located within a predetermined distance from a wireless base station. The in-vehicle wireless terminal further includes a control section configured to set transmission power to a maximum value to perform data transmission to the wireless base station if the disconnection detection section detects that the antenna is disconnected and if the determination section determines that the vehicle is located within the predetermined distance from the wireless base station.

4 Claims, 3 Drawing Sheets

IN-VEHICLE WIRELESS COMMUNICATION TERMINAL

CROSS REFERENCE TO RELATED APPLICATION

The present application is based on and claims priority to Japanese Patent Application No. 2010-87739 filed on Apr. 6, 2010, disclosure of which is incorporated herein by reference.

BACKGROUND OF THE INVENTION

1. Field of the Invention

The present invention relates to an in-vehicle wireless terminal mounted to a vehicle and having a function to perform wireless communication with a wireless base station.

2. Description of Related Art

An in-vehicle wireless terminal mounted to a vehicle can be configured to control transmission power. For example, the in-vehicle wireless terminal increases the transmission power if the in-vehicle wireless terminal cannot perform the wireless communication with the wireless base station, e.g., if an antenna is disconnected or if an antenna wire (i.e., a connecting wire which connects the antenna to the in-vehicle wireless terminal) is disconnected. Because of the above configuration, if the in vehicle wireless terminal cannot perform the wireless communication with the wireless base station, the in-vehicle wireless terminal seeks to recover or establish the wireless communication with the wireless base station. It should be noted that the above-described situation where the in-vehicle wireless terminal cannot perform the wireless communication with the wireless base station includes a situation where the in-vehicle wireless terminal cannot establish a communication link. Thus, a disconnection of the antenna or the antenna wire is not a complete disconnection that completely disables wireless communications capacity. A disconnection of the antenna or the antenna wire includes a disconnection that does not completely disable the wireless communications capacity of the in-vehicle wireless terminal but decreases the wireless communications capacity of the in-vehicle wireless terminal.

Since a vehicle travels, the vehicle may travel so as to approach the wireless base station, may travel so as to recede from the wireless base station, or may keep traveling in places faraway from, the wireless base station. Thus, if the vehicle keeps traveling while receding from the wireless base station for a long time period or keeps traveling in places faraway from the wireless base station for a long time period, the transmission power is maintained at a high level for the long time period. This can causes a problem of wasted power consumption, heating the in-vehicle wireless terminal, or the like. JP-2003-298507A (corresponding to Japanese Patent No. 3846351) describes a mobile wireless terminal that suppresses power consumption by prohibiting data transmission if the mobile wireless terminal is inside a structural body causing a weak electric filed such as a tunnel and the like.

SUMMARY OF THE INVENTION

In view of the foregoing, it is an objective of the present invention to provide an in-vehicle wireless terminal that can prevent wasted power consumption or heating the in-vehicle wireless terminal.

According to a first aspect of the present invention, an in-vehicle wireless terminal mounted to a vehicle and having a function to perform wireless communication with a wireless base station is provided. The in-vehicle wireless terminal includes: a disconnection detection section configured to detect whether one of an antenna and a connecting wire connecting the antenna to the in-vehicle wireless terminal is disconnected; a determination section configured to determine whether the vehicle is located within a predetermined distance from the wireless base station; and a control section configured to control transmission power by setting the transmission power to a maximum value to perform data transmission at the maximum value of the transmission power if the disconnection detection section detects that one of the antenna and the connecting wire is disconnected and if the determination section determines that the vehicle is located within the predetermined distance from the wireless base station.

According to the above in-vehicle wireless terminals, it is possible to prevent electric power from being wastefully consumed, and it is possible to prevent the in-vehicle wireless terminal from being heated.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF EMBODIMENTS

Figure 1:
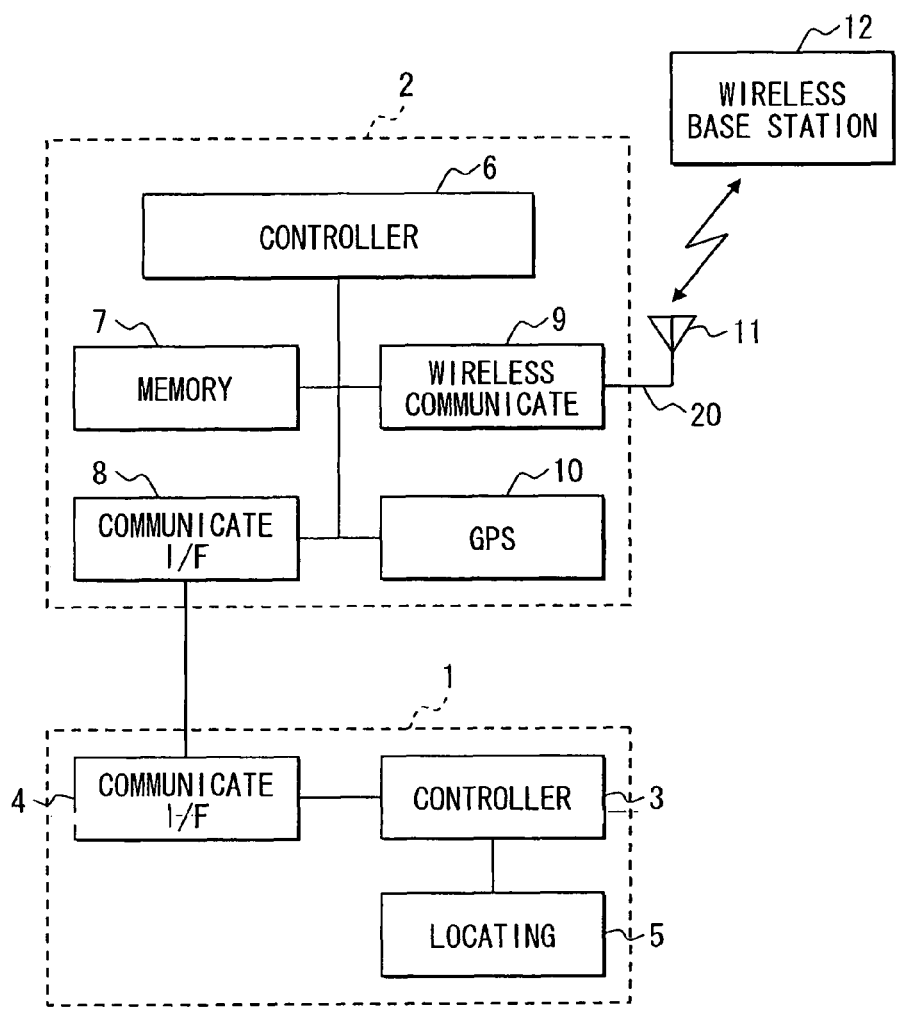
FIG. 1 is a block diagram illustrating a wireless communication system of a first embodiment.

A first embodiment of the present invention will be described with reference to FIGS. 1 and 2. FIG. 1 is a block diagram schematically illustrating a whole configuration of a wireless communication system for a vehicle, which is provided with an in-vehicle wireless terminal of the present embodiment. The wireless communication system includes a car navigation apparatus 1 and an in-vehicle wireless terminal 2, which are mounted to a vehicle. The car navigation apparatus 1 is an example of an in-vehicle information terminal.

The car navigation apparatus 1, which may be configured as a known car navigation apparatus, includes a controller 3, a communication I/F (interface) 4, and a locating device 5. The car navigation apparatus 1 further includes a map data input device, a group of operation switches, a VICS (Vehicle Information and Communication System) unit, an external memory, a display device, a speech control device, a speech recognition device, a remote control and the like, each of which is not shown in the drawings. The controller 3 controls the car navigation apparatus 1 as a whole. The controller 3 has a route retrieval function to automatically select an optimum route from a present position detected with the locating device 5 to a destination, and form and display a guidance route. In the above, the automatic selection of an optimum route may be made in response to an input of a destination via the group of operation switches or the like.

The controller 3 further has a function to communicate with an in-vehicle apparatus other than the car navigation apparatus 1 via the communication I/F 4. For example, the controller 3 can communicate with the in-vehicle wireless terminal 2 via the communication I/F 4. The locating device 5 includes a gyroscope, a distance sensor, a GPS (global positioning system) receiver, a steering wheel rotation sensor, a tire wheel sensor, a vehicle inclination sensor, and the like.

The locating device 5 has a function to accurately detect position (including latitude and longitude) of the vehicle by using the foregoing multiple sensors while detection results of the multiple sensors are being compensated each other.

The in-vehicle wireless terminal 2 includes a controller 6, a memory 7, a communication I/F 8, a wireless communication device 9, and a GPS location device 10. The controller 6 controls the in-vehicle wireless terminal 2 as a whole. The controller 6 can act as a disconnection detection means or section, a determination means or section, a control means or section, and an emergency detection means or section. The controller 6 has a function to communicate with the wireless base station 12 via the wireless communication device 9 and an antenna 11. The antenna is connected with the wireless communication device 9 via a connecting wire 20 (also referred to as an antenna wire 20). Because of the above configuration, the in-vehicle wireless terminal 2 can have a connection to a wireless communication network such as a cellular phone communication network and the like via the wireless base station 12 to communicate with a desired information center (not shown). When the in-vehicle wireless terminal 2 has the connection to the wireless communication network, the controller 6 can communicate with the wireless base station 12, receive information about position (including latitude and longitude) of the wireless base station 12, and records the received information about the position of the wireless base station 12 in the memory 7. In the above, the memory 7 may be a non-volatile memory for example. In this way, as the vehicle travels, the in-vehicle wireless terminal 2 can accumulate and store the information about positions of multiple wireless base stations 12 located at various places.

The controller 6 further has a function to communicate with an in-vehicle apparatus other than the in-vehicle wireless terminal 2 via the communication I/F 8. For example, the controller 6 can communicate with the car navigation apparatus 1 via the communication I/F 8. The controller 6 further has a function to acquire, by communicating with the car navigation apparatus 1, the information about accurate present position of the vehicle detected with the locating device 5 of the car navigation apparatus 1. The controller 6 further has a function to record the acquired information in the memory 7. The controller 6 further has a function to acquire information about position (including latitude and longitude) of the vehicle detected with the GPS location device 10, which is a built-in component of the in-vehicle wireless terminal 2. In the memory 7, the controller 6 records the information about the position (including latitude and longitude) of the vehicle detected with the GPS location device 10. The GPS location device 10 includes a GPS receiver, and has a function to detect position of the in-vehicle wireless terminal 2 or position of the vehicle and input the information about the detected position to the controller 6.

The controller 6 acquires the positional information of the vehicle from the car navigation apparatus 1 and that from the built-in GPS location device 10, and uses highly-accurate one of the positional information from the car navigation apparatus 1 and that from the built-in GPS location device 10. In a normal case, the positional information from the car navigation apparatus 1 may have higher accuracy as compared with the positional information from the built-in GPS location device 10.

Operation associated with the above-described configuration will be described with reference to FIG. 2. FIG. 2 is a flowchart illustrating one of control operations performed by the controller 6 of the in-vehicle wireless terminal 2. The control operation illustrated in FIG. 2 is associated with a disconnection of the antenna 11 and a disconnection of the connecting wire 20 connected to the antenna 11. In the present disclosure, a disconnection of the antenna 11 or the connecting wire 20 is not a complete disconnection that completely disables wireless communications capacity. A disconnection of the antenna 11 or the connecting wire 20 includes a disconnection that does not completely disable the wireless communications capacity of the in-vehicle wireless terminal 2 but decreases the wireless communications capacity of the in-vehicle wireless terminal 2.

At S10, the controller 6 of the in-vehicle wireless terminal 2 determines, in a well-known manner in the art, whether one of the antenna 11 and the connecting wire 20 connecting between the antenna 11 and the wireless communication device 9 is disconnected. In the present disclosure, for simplicity, the above determinations as to a disconnection of one of the antenna 11 and the connecting wire 20 is also referred to as a determination or detection of a disconnection of the antenna 11.

If it is determined that the antenna 11 is disconnected, corresponding to "YES" at S10, the process proceeds to S20. At S20, the controller 6 acquires the information about the present position of the vehicle and acquires information about position of a nearest wireless base station 12, which is nearest to the present position of the vehicle among positions of multiple wireless base stations. It is noted that the information about positions of multiple wireless base stations are accumulated in the memory 7.

After S20, the process proceeds to S30. At S30, the controller 6 determines whether the vehicle is located close to the wireless base station 12, i.e., whether the vehicle is located within a predetermined distance from the wireless base station 12. More specifically, the controller 6 determines whether a distance between the present position of the vehicle and the position of the nearest wireless base station 12 becomes less than or equal to a predetermined distance. The predetermined distance may be, for example, 1 km, 500 m or the like. If it is determined that the distance between the present position of the vehicle and the position of the nearest wireless base station 12 becomes less than or equal to the predetermined distance, corresponding to "YES" at S30, the process proceeds to S40. At S40, the controller 6 sets transmission power of the in-vehicle wireless terminal 2 to a maximum value (i.e., maximum rating). At S50, the controller 6 causes the in-vehicle wireless terminal 2 to perform data transmission to the wireless base station 12 at the maximum value of the transmission power.

At S60, the controller 6 determines whether the wireless communication with the wireless base station 12 has been successfully performed. If the wireless communication with the wireless base station 12 has been successfully performed, corresponding to "YES" at S60, the process proceeds to S80. At S80, the controller 6 sets the transmission power of the in-vehicle wireless terminal 2 back to an original value (i.e., normal transmission power). Then, the in-vehicle wireless terminal 2 performs the wireless communication at the original value of the transmission power.

If it is determined that the wireless communication with the wireless base station 12 has not been successfully performed, corresponding to "NO" at S60, the process proceeds to S70. At S70, the controller 6 determines whether the number of times the data transmission is performed at the maximum value of the transmission power reaches a predetermined number of times (e.g., three times). If the number of times the data transmission is performed at the maximum value of the transmission power does not reach the predetermined number of times, corresponding to "NO" at S70, the process returns to S20 to re-perform acquiring the information about position of the wireless base station 12 that is nearest to the present position of the vehicle. If it is determined that the number of times the data transmission is performed at the maximum value of the transmission power reaches the predetermined number of times, corresponding to "YES" at S70, the process proceeds to S80. At S80, the controller 6 sets the transmission power of the in-vehicle wireless terminal 2 back to the original value.

If it is determined at S30 that the distance between the present position of the vehicle and the position of the wireless base station 12 nearest to the present position of the vehicle is not less than or equal to the predetermined distance, that is, if the vehicle is not located dose to the wireless base station 12, the determination "NO" is made at S30. In this case, the process proceeds to S80, at which the transmission power is set back to the original value (i.e., normal transmission power). For example, if it is determined, after the data transmission is performed at the maximum value of the transmission power, that the vehicle is not located, within the predetermined distance from the wireless base station 12, the transmission power is set back to the original value (i.e., normal transmission power).

If it is determined at S10 that the antenna 11 is not disconnected, the determination "NO" is made at S10. In this case, the process proceeds to S80, at which the transmission power is set back to the original value (i.e., normal transmission power).

In the present embodiment, only if the vehicle approaches the wireless base station 12 when the antenna 11 or the connecting wire 20 etc. is disconnected, the transmission power of the in-vehicle wireless terminal 2 is set to a maximum value (maximum rating), and the data transmission is performed at the maximum value of the transmission power. Therefore, even if the antenna 11 or the connecting wire 20 etc. is disconnected, the in-vehicle wireless terminal 2 can increase a possibility of successful wireless communication between the in-vehicle wireless terminal 2 and the wireless base station 12. Furthermore, if the vehicle is traveling in a place faraway from and not close to the wireless base station 12 when the antenna 11 or the connecting wire 20 etc. is disconnected, the present embodiment does not increase the transmission power unlike a related art does. It should be noted that, in the related art, if the vehicle is traveling in a place faraway from the wireless base station 12 when the antenna 11 or the connecting wire 20 etc. is disconnected, the transmission power is increased. Therefore, according to the present embodiment, it is possible to prevent a problem of wasted power consumption or heating the in-vehicle wireless terminal 2.

Moreover, according to the present embodiment, if the wireless communication is not successfully established or recovered even after a maximum-power wireless communication operation, which is the data transmission to the wireless base station 12 at the maximum value of the transmission power, has been performed the predetermined number of times, the transmission power is set back to the original value. Therefore, the problem of wasted power consumption or heating the in-vehicle wireless terminal 2 can be prevented in a more effective manner.

Moreover, according to the present embodiment, if the wireless communication is successfully established or recovered after the maximum-power wireless communication operation, the transmission power is set back to the original value. Therefore, the problem of wasted power consumption or heating the in-vehicle wireless terminal 2 can be prevented in a more effective manner.

Figure 3:
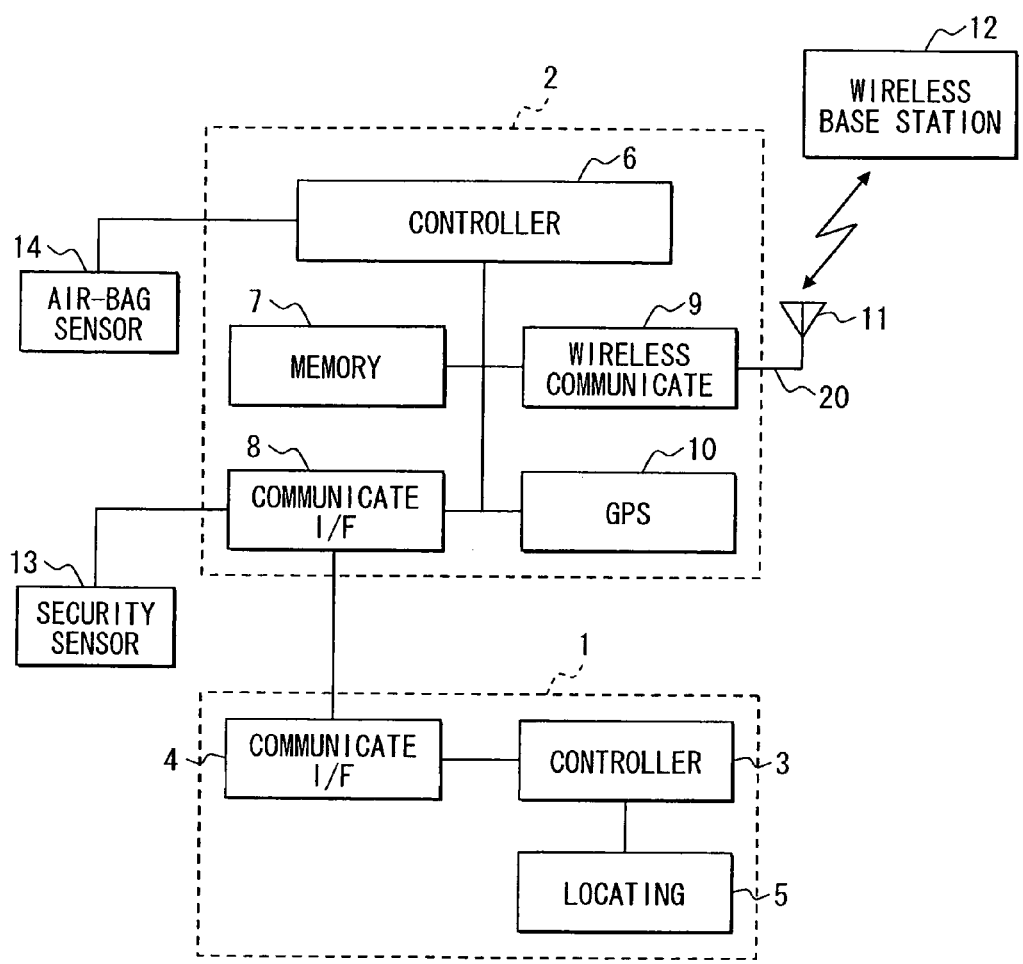
FIG. 3 is a block diagram illustrating a wireless communication system of a second embodiment.

A second embodiment will be described. FIG. 3 illustrates a wireless communication system of the second embodiment. Between the first embodiment and the second embodiment, like reference numerals are used to refer to like parts. In the second embodiment, a security sensor device 13 and an airbag sensor device 14 are mounted to the vehicle. The in-vehicle wireless terminal 2 is configured to receive a detection signal of the security sensor device 13 and a detection signal of the air-bag sensor device 14. The security sensor device 13 includes various sensors for detecting vehicle theft, which is an example of an emergency event. The air-bag sensor device 14 includes a sensor for detecting a vehicle collision, which is also an example of an emergency event.

Figure 2:
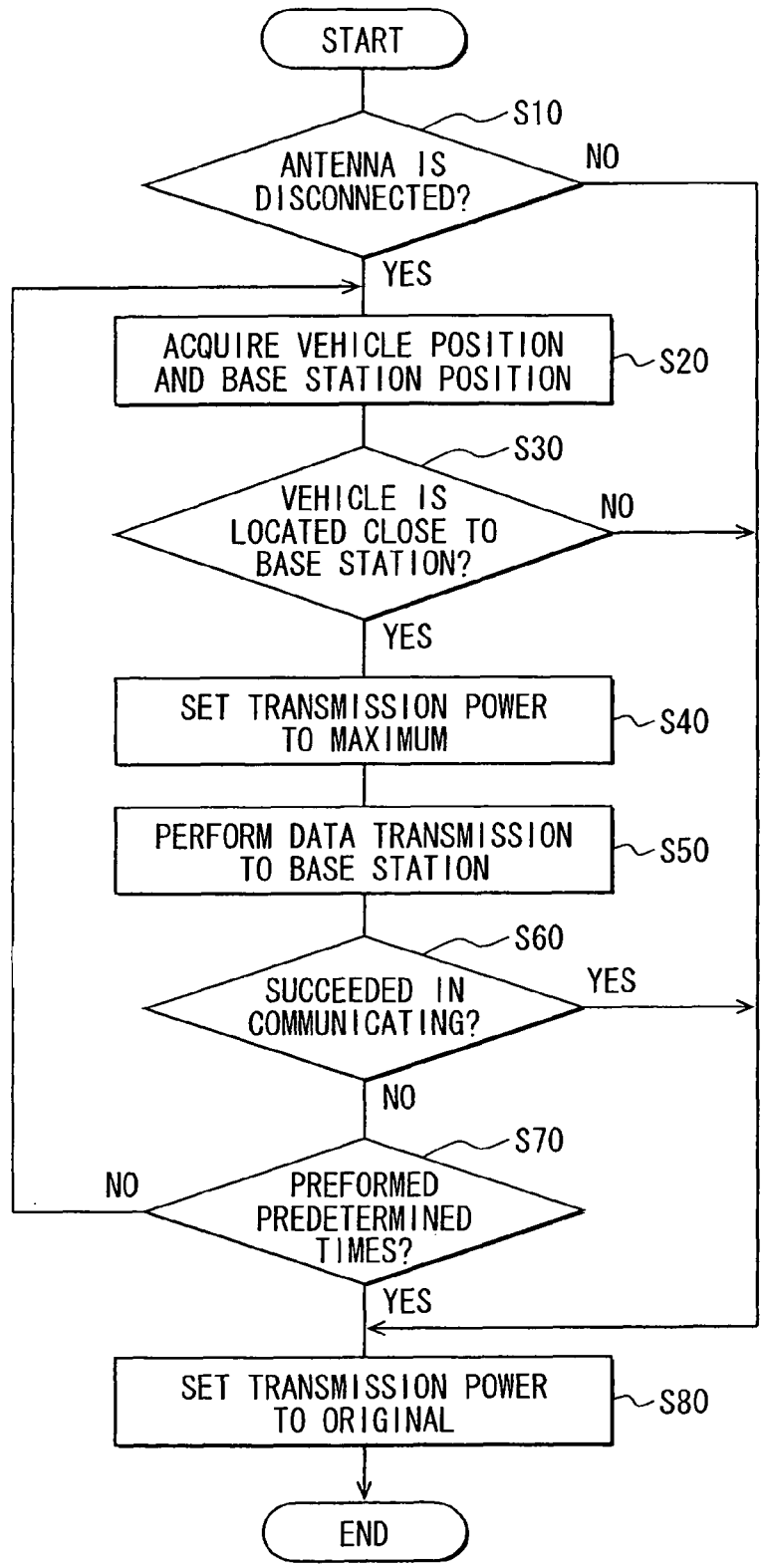
FIG. 2 is a flowchart illustrating an operation performed by an in-vehicle wireless terminal.

In the first embodiment, if a disconnection of the antenna 11 is detected, the controller 6 of the in-vehicle wireless terminal 2 performs the control operation illustrated in FIG. 2. In the second embodiment, if a disconnection of the antenna 11 is detected and if an emergency event associated with the vehicle is detected, the controller 6 of the in-vehicle wireless terminal 2 performs the control operation illustrated in FIG. 2. More specifically, only when the in-vehicle wireless terminal 2 reports the emergency even such as the vehicle theft, the vehicle collision or the like, the controller 6 performs the control operation illustrated in FIG. 2. For example, if the controller 6 of the in-vehicle wireless terminal 2 detects the vehicle theft by receiving the detection signal indicating a vehicle theft from the security sensor device 13, the controller 6 performs the control operation illustrated in FIG. 2 in order to report the vehicle theft. Alternatively, if the controller 6 of the in-vehicle wireless terminal 2 detects the vehicle collision by receiving the detection signal indicating the vehicle collision from the air-bag sensor device 14, the controller 6 performs the control operation illustrated in FIG. 2 in order to report the vehicle collision. As can be seen from the above, the controller 6 can act as an emergency detection means or section, a theft report means or section, and an emergency report means or section.

The second embodiment can have the substantially same configuration as the first embodiment, except for the foregoing points. Therefore, the second embodiment can have the substantially same advantage as the first embodiment. In the second embodiment in particular, only when the in-vehicle wireless terminal 2 reports an occurrence of an emergency event such as the vehicle theft, the vehicle collision and the like, the in-vehicle wireless terminal performs the control operation to control the transmission power, as illustrated in FIG. 2. Therefore, the in-vehicle wireless terminal can report an occurrence of an emergency event such as, the vehicle theft, the vehicle collision and the like in a manner as reliable as possible. Moreover, it is possible to prevent the problem of wasted power consumption or heating the in-vehicle wireless terminal. Moreover, in the second embodiment, since an opportunity for the transmission power to have the maximum value is reduced to as less as possible, it is possible to reduce an influence on other in-vehicle electronic apparatuses.

In the above embodiments, the in-vehicle wireless terminal is configured to determine whether the vehicle is located close to the wireless base terminal 12, based on the information about the present position of the vehicle and the accumulated information about positions of wireless base stations 12 located at various places. Alternatively, the in-vehicle wireless terminal may store and accumulate a map of received radio wave strength in place of the information about positions of wireless base stations 12. Based on the information about the present position of the vehicle and the map of received radio wave strength, the in-vehicle wireless terminal may determine whether the vehicle is located close to the wireless base terminal 12.

According to a first example of the present disclosure, an in-vehicle wireless terminal mounted to a vehicle and having a function to perform wireless communication with a wireless base station may be configured in the following way. The in-vehicle wireless terminal includes: a disconnection detection section configured to detect whether one of an antenna and a connecting wire connecting the antenna to the in-vehicle wireless terminal is disconnected; a determination section configured to determine whether the vehicle is located within a predetermined distance from the wireless base station; and a control section configured to control transmission power by setting the transmission power to a maximum value and performing data transmission to the wireless base station at the maximum value of the transmission power if the disconnection detection section detects that one of the antenna and the connecting wire is disconnected and if the determination section determines that the vehicle is located within the predetermined distance from the wireless base station. According to the above in-vehicle wireless terminal, it is possible to prevent electric power from being wastefully consumed, and it is possible to prevent the in-vehicle wireless terminal from being heated.

The above in-vehicle wireless terminal may be configured such that: the control section is further configured to control the transmission power by setting the transmission power back to an original value if the determination section determines, after the data transmission is performed at the maximum value of the transmission power, that the vehicle is not located within the predetermined distance from the wireless base station. In this configuration, it is possible to prevent, in a more effective manner, the electric power from being wastefully consumed and it is possible to prevent the in-vehicle wireless terminal from being heated.

The above in-vehicle wireless terminal may be configured such that: the control section is further configured to control the transmission power by setting the transmission power back to an original value if the wireless communication with the wireless base station has not been successfully performed even after the data transmission at the maximum value of the transmission power has been performed a predetermined number of times. In this configuration, it is possible to prevent electric power from being continuously and wastefully consumed.

The above in-vehicle wireless terminal may be configured to further include an emergency detection section configured to detect an emergency event associated with the vehicle the control section is further configured to control the transmission power by setting the transmission power to the maximum value only if: the emergency detection section detects the emergency event associated with the vehicle; the disconnection detection section detects that one of the antenna and the connecting wire is disconnected; and the determination section determines that the vehicle is located within the predetermined distance from the wireless base station.

The above in-vehicle wireless terminal may be also configured such that: the control section is further configured to control the transmission power by setting the transmission power back to an original value if the determination section determines, after the data transmission is performed at the maximum value of the transmission power, that the vehicle is not located within the predetermined distance from the wireless base station. Alternatively, the above in-vehicle wireless terminal may be configured such that: the control section is further configured to control the transmission power by setting the transmission power back to an original value if the wireless communication with the wireless base station has not been successfully performed even after the data transmission at the maximum value of the transmission power has been performed a predetermined number of times.

While the invention has been described above with reference to various embodiments thereof, it is to be understood that the invention is not limited to the above described embodiments and constructions. The invention is intended to cover various modifications and equivalent arrangements.

Further, each or any combination of procedures, processes, steps, or means explained in the above may be achieved as a software section or means (e.g., subroutine) and/or a hardware section or means (e.g., circuit or integrated circuit), including or not including a function of a related device; furthermore, the hardware section or means can be constructed inside of a microcomputer.

Furthermore, the software section or means or any combinations of multiple software sections or means may be included in a software program that is stored in a computer-readable storage media or a computer.

What is claimed is:

1. An in-vehicle wireless terminal mounted to a vehicle and having a function to perform wireless communication with a wireless base station, the in-vehicle wireless terminal comprising:
    disconnection detection unit for detecting disconnection of an antenna or a connecting wire, wherein the connecting wire connects the antenna to the in-vehicle wireless terminal;
    a determination unit for determining whether or not the vehicle is located within a predetermined distance from the wireless base station; and
    a control unit for performing data transmission by setting transmission power to a maximum value when:
        the disconnection detection unit detects the disconnection of the antenna or the connecting wire; and
        the determination unit determines that the vehicle is located within the predetermined distance from the wireless base station.

2. The in-vehicle wireless terminal according to claim 1, wherein:
    the control unit sets the transmission power back to an original value when:
        after the data transmission is performed with the maximum value of the transmission power, the determination unit determines that the vehicle is not located within the predetermined distance from the wireless base station.

3. The in-vehicle wireless terminal according to claim 1, wherein:
    the control unit sets the transmission power back to an original value when:
        even after the data transmission with the maximum value of the transmission power has been performed a predetermined number of times, the wireless communication with the wireless base station has been unsuccessful.

4. The in-vehicle wireless terminal according to claim 1, further comprising:
    a theft report unit for reporting a theft of the vehicle; and
    an emergency report unit for reporting an emergency event of the vehicle, wherein
    when: the disconnection detection unit detects the disconnection of the antenna or the connecting wire; and the determination unit determines that the vehicle is located within the predetermined distance from the wireless base station, the control unit sets the transmission power to the maximum value only during reporting of the theft of the vehicle or reporting of the emergency event of the vehicle.

* * * * *